United States Patent [19]

Mielke

[11] 4,051,502

[45] Sept. 27, 1977

[54] MULTIPLE ELEMENT FOCAL PLANE SHUTTER FOR PHOTOGRAPHIC CAMERAS

[75] Inventor: Bodo Mielke, Wolfenbuttel, Germany

[73] Assignee: Rollei-Werke Franke & Heidecke, Braunschweig, Germany

[21] Appl. No.: 630,341

[22] Filed: Nov. 10, 1975

[30] Foreign Application Priority Data

Dec. 20, 1974 Germany .................. 2460442

[51] Int. Cl.$^2$ .................................. G03B 9/38
[52] U.S. Cl. .................. 354/249; 354/245; 354/246; 354/248
[58] Field of Search ............... 354/245–249, 354/250, 261, 265

[56] References Cited

U.S. PATENT DOCUMENTS 3,513,763  5/1970  Singer .................. 354/246
3,864,713  2/1975  Kitai et al. ............ 354/246
3,988,754  10/1976  Rentschler et al. ..... 354/249

FOREIGN PATENT DOCUMENTS 2,254,521  5/1974  Germany .............. 354/249

*Primary Examiner*—Russell E. Adams
*Attorney, Agent, or Firm*—Ralf H. Siegemund

[57] ABSTRACT

Two sets of lamellas are moved across the image aperture in a photographic cameras, whereby the lamellas of each set move in different but parallel planes. Each lamella is coupled to a crank pin and the pins are, on the one hand, guided for movement in parallel paths to move the lamellas of the set colinearly across the aperture while, on the other hand, the crank pins are being moved by a pivoting, slotted lever in which the pins glide. Guiding of the pins may include use of slide tracks or of linear ball bearings for guide elements carrying the pins.

9 Claims, 4 Drawing Figures

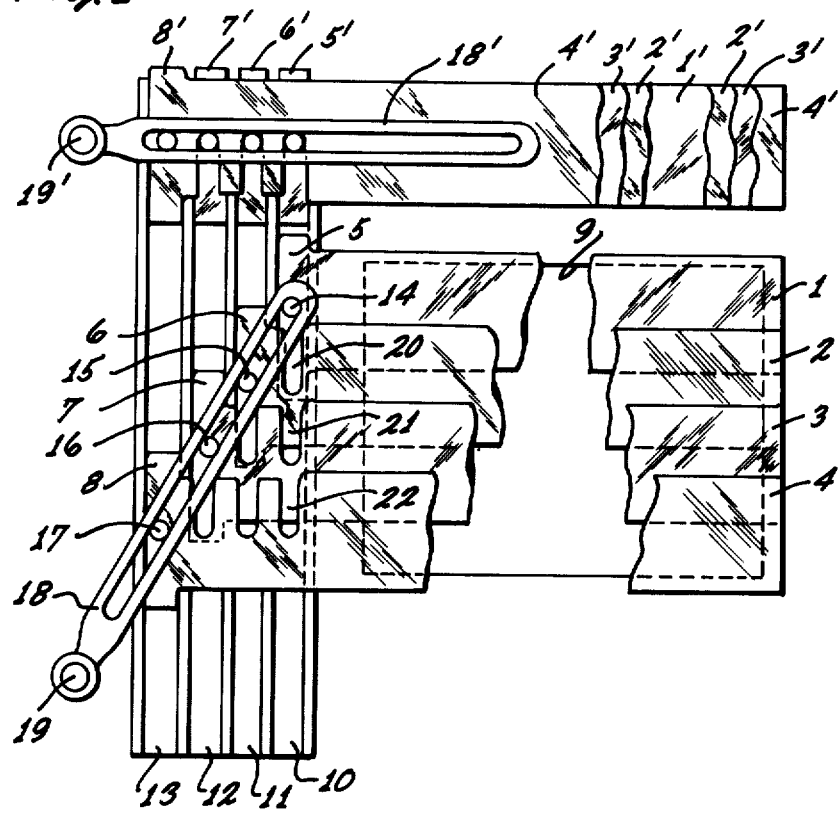
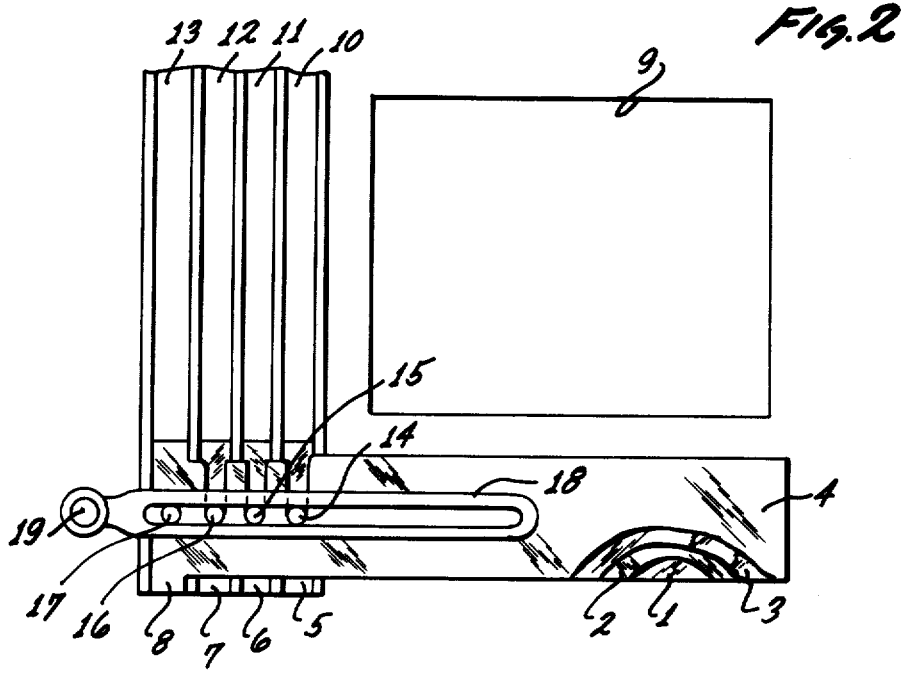

MULTIPLE ELEMENT FOCAL PLANE SHUTTER FOR PHOTOGRAPHIC CAMERAS

BACKGROUND OF THE INVENTION

The present invention relates to a focal plane shutter with multiple shutter elements to be used in a photographic camera, and more particularly the invention relates to a focal plane shutter having plural, superimposed but movable lamellas.

Focal plane shutters using plural lamellas have the advantage that the lamellas occupy only very little space, particularly when in a position of opening the image aperture or gate in the camera. The height of that space is predominately determined by the height of the individual lamellas, and for a larger number of lamellas that height will be smaller.

The known, multiple lamella type shutters provide either for individual control and actuating operation for each of the lamellas, using a parallelogram-like lever linkage to be connected to each of the lamellas. Or, in the alternative, the first one of the lamellas is controlled by such a lever linkage while the others are linked to the first one via smaller paralelogram-like lever linkages. Unfortunately, the overall control mechanism in either case becomes rather bulky and expensive and inherently involves large masses which have to be moved. As the shutter drive mechanism has a particular power output, large masses to be moved pose inherently an impediment as to shutter speed. Moreover, the drive linkage is always connected directly to the lamellas which, in turn, requires the lamellas to have significant strength and/or thickness. Again, this is a feature which adds to the mass which has to be moved and is, therefore, an impediment for attaining high speeds of lamella movement.

DESCRIPTION OF THE INVENTION

It is an object of the present invention to provide for a new and improved construction for focal plane shutters using individual lamellas wherein particularly the drive mechanism does not add any significant weight to the parts that have to be moved.

In accordance with the preferred embodiment of the present invention, it is suggested to provide individual lamellas extending for the entire width of the image aperture or gate, and each being provided for movement in a plane respectively extending parallel to the plane of the aperture, the several planes of movement being spaced transversely to their extension so that each of the lamellas can move independently from the other ones. Each of the lamellas is connected to a guide element and these guide elements are laterally offset. Each of the guide elements is guided by appropriate means to move its respective lamella in the desired direction of movement. The guide elements respectively carry pins and a slotted crank lever receiving and engaging the pins causes the guide elements to move into their respective tracks or guides, and thereby the lamellas are moved in unison but at different speeds. A similar arrangement is placed either on the other side of the image aperture or on the same side but in offset relation to the first mentioned arrangement so that two sets of lamellas can be moved across the aperture whereby movement in the same direction causes one set to open the aperture while the other set closes the aperture.

The shutter mechanism runs somewhat smoother if each lamella, except one, is associated with two guide elements. All of these guide elements are arranged respectively in pairs and symmetrical to a central one. The central guide element is preferably the one which connects to the lamella that is always being moved the farthest and the fastest. Each guide element may be guided individually; for example, the guide elements may be constructed as slide elements being held and moving in appropriate guide or rail structures. In the alternative, it is also possible to provide merely a set of two outer stationary guide surfaces and to movably separate the guide elements from each other. The guide elements will be flat elements in this case, and they are movable per se but serve as tracks for rolls, balls or the like. The separating elements to be used here will be constructed as linear roller bearings or, more precisely, as ball cages with balls of the type used in roller bearings.

DESCRIPTION OF THE DRAWING

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIG. 1 shows a focal plane shutter in accordance with the preferred embodiment of the invention;

FIG. 2 shows a portion of the same shutter portion;

Proceeding now to the detailed description of the drawings, FIGS. 1 and 2 illustrate an image aperture, gate, or window 9 in a photographic camera as seen, for example, from the lens, looking toward the image plane. The film to be exposed is disposed behind the aperture 9 accordingly. As shown specifically in FIG. 1, the image aperture is closed from the front by four lamellas 1, 2, 3, and 4, which are elongated, flat, and thin slats disposed in overlapping and staggered relation whereby lamella 1 has position closest to the aperture 9, and lamella 4 is disposed farthest apart from the aperture so that lamellas 1, 2, and 3 can fit in between the frame of aperture 9 and the lamella 4.

Figure 3:
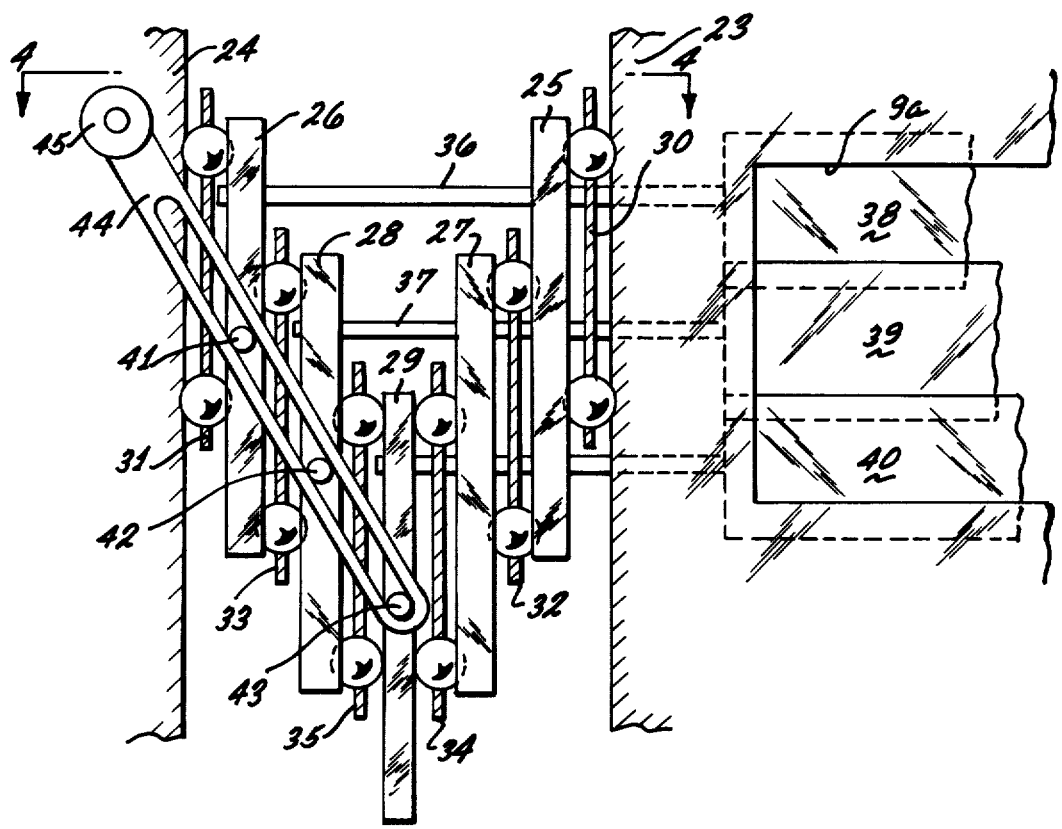
FIG. 3 shows a modified version of such a shutter with dual guidance for lamellas.
Figure 4:
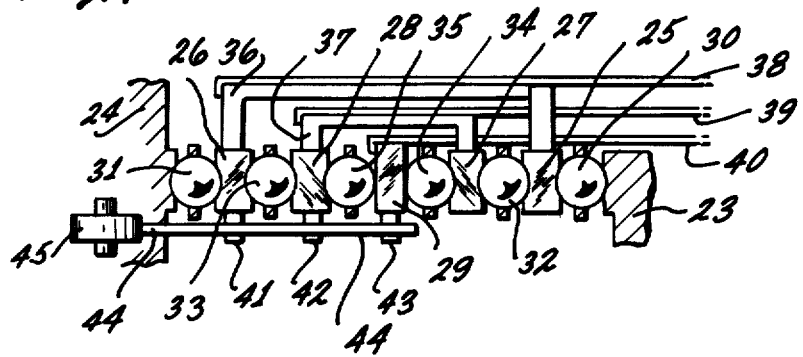
FIG. 4 shows a view in section plane IV — IV in FIG. 3.

A similar, second set of four lamellas is disposed above the aperture 9. Of these one lamella $4^1$ is visible directly in the plane of the drawings, the other lamellas, $1^1$, $2^1$ and $3^1$ are positioned behind lamella 4, closer to the frame having window or aperture 9.

The lamellas 1 through 4 (and $1^1$ through $4^1$) are differently long, or more precisely, they have differently long lateral extensions beyond the aperture area. Each lamella terminates in a transverse guide or slide element constructed as slide blocks 5, 6, 7, and 8 (and $5^1$ through $8^1$ for the second set). These slide elements are integral with or, at least, rigidly connected to the respective lamella. Due to the differences in lamella length, the slide elements are laterally offset, each of them sliding in its own rail and guide system. These guides, or guide rails are denoted by reference numeral 10, 11, 12, and 13 for respectively establishing straight vertical guide and slide tracks or paths for the pairs of the slide elements 5, $5^1$ through 8, $8^1$. Due to the elongated extension of each slide block, they cannot turn in their respective track, so that they impede any rotation of the respective lamella.

The guides 10 through 13 are additionally staggered transversely to the plane of the drawing because each lamella moves vertically in a different plane, but all these planes extend parallel to each other and in front of window 9. Alternately, guies 10 through 13 could be arranged in the same plane and the respective slide elements, particularly 6, 7 and 8 will be bent off to ride in the respective guides but causing the respective lamellas to move in different planes.

Each slide element for the first set has a crank pin so that there are provided pins 14, 15, 16, and 17 respectively which project (in the drawing) in forward direction. The pins all are received in an elongated slot of a flat element 18 constituting a slotted crank-type arm or lever. Each of the pins can slide in the slot, but all pins are spaced so that they do not interfere with each other. Lever element 18 with pins establish a crank because lever 18 is mounted on a turning shaft 19. The shaft 19 rotates or is permitted to rotate over a limited angular range. The range of rotation and deflection is delineated by the dispositions of crank element 18 in FIGS. 1 and 2 respectively showing the two extreme positions which lever 18 can assume.

The slide elements $5^1$ to $8^1$ of the second set move also in the tracks 10 to 13 respectively, and they have pins which are received in the slot of the second crank arm $18^1$ which pivots about the axis of a second shaft on axle $19^1$.

The lamellas 2, 3, and 4 have respectively slots 20, 21, and 22 which are all vertically aligned with pin 14 on slide elements. The lamella 3 has another, similar slot, and lamella 4 has two more slots whereby the one additional slot of lamella 3 and one of the two additional slots of lamella 4 are vertically aligned with pin 15 of slide element 6 and the third slot of lamella 4 is vertically aligned with pin 16 on slide element 17. The lamellas $2^1$, $3^1$ and $4^1$ have similar slots and are constructed analogously.

Presently the operation of one of the sets of lamellas is to be considered individually. Upon turning lever 18 in clockwise direction, from the disposition shown in FIG. 1, the oblique slot in lever 18 cooperates with the four vertically guided slide elements via the respective pins to move the lamellas down. The lamellas are moved at different speeds whereby lamella 1 moves the fastest, and lamella 4 moves apparently slow. However, they all end up in a position of alignment shown in FIG. 2 in which particularly the lamellas are horizontally aligned in front of the bottom portion of the frame which defines and establishes the image aperture 9. The second set of lamellas is shown in that alignment or retracted position in FIG. 1.

The position of crankshafts 19 has been chosen so that upon assuming a horizontal disposition, lever 18 holds the pins 14 through 17 in horizontal alignment, and all lamellas have been moved down into a horizontally aligned disposition, transverse to the plane of the drawing as shown in FIG. 2, thereby opening aperture 9 completely. Also, the several slots in the lamellas are aligned and, in fact, they lock the lever 18 in that position. Returning for a moment to FIG. 1, it can readily be seen that the terminal position for the lever 18 when deploying the lamellas, is established by abutment of pin 14 at the end of the slot.

The second set of lamellas $1^1$ to $4^1$ as disposed above aperture 9 in FIG. 1 has the same disposition that lamellas 1 to 4 have in FIG. 2. The second slotted crank lever $18^1$ moves these elements upon turning of the second shaft $19^1$ but in clockwise direction for deployment of the lamellas and counterclockwise for retraction.

It can readily be seen that the two sets of lamellas have normally different dispositions. That is, one set closes the aperture 9 and the other one opens it. A movable slit is produced by causing the (initially) closing set of lamellas to open, followed at a slight delay by causing the other (upper) set of lamellas to close the aperture.

Both levers, 18 and $18^1$, will turn in clockwise direction out of the position shown in FIG. 1. The delay meters the width of the slot. For relatively long time exposures, the closing set of lamellas is caused to open the aperture at first and the other set closes subsequently depending on the time of exposure desired. FIG. 2 is actually an illustration of that situation, the upper set has been merely omitted for reasons of simplifying the illustration.

The two sets of lamellas are controlled from different shafts, 19 and $19^1$, and here the usual and conventional, dual output drive mechanism is used as is commonly practiced for focal plane shutters. The particular shutter, as a whole, does not have to distinguish between a cocked and a released disposition because the complete symmetry of the lamella structures and their actuating mechanism permit operation in either direction. Exposure opening and closing and/or slit formation can be provided for by up or by down moving lamellas.

The particular lamella of each set which will extend the farthest when the set closes the aperture, i.e. lamellas 1 and $1^1$ may conceivably permit a slight overlap with each other if it is desired to move the lamellas of both sets across the aperture without opening up the slit.

Another modification is readily apparent from the drawings. The two sets of shutter lamellas can be placed on opposite sides of aperture 9. Thus, the first set (1 to 4) has positions as illustrated, and the second, similar arrangement is provided on the other side of the aperture, in two-fold mirror-image symmetry. Actually, FIG. 1 (after deletion of the elements with a [$^1$] can simply by interpreted in a two-fold manner, because upon looking toward the aperture 9 from the other side, (e.g. the film plane side) and turning the camera upside down, the view will be exactly the same as FIG. 1.

The embodiment illustrated in FIG. 3 shows an improved lamella guide system. Reference numerals 23 and 24 denote stationary, parts of the camera defining two parallel, vertical guide surfaces and tracks. Part 23 may constitute a portion of the frame that defines the image aperture 9a. The embodiment shows, moreover, three lamellas, 38, 39, and 40, each having a vane-like lateral extension whereby lamellas 38 and 39 are respectively connected to bridges 36 and 37 which, in turn, interconnect flat elements 25, 26 (36) and 27, 28 (37). The central element 29 is directly connected to a vane extending from lamella 40. These flat elements, 25 through 29, show as guide elements for the lamellas.

The mechanism includes a plurality of longitudinal ball bearings with ball cages 30 through 35. The balls of these bearings roll on the flat surfaces of elements 25 to 29 which establish, in effect, the races for these bearings. These ball bearings and cages are arranged as follows: cage 30 with balls is disposed between element 25 and the slide surface of stationary part 23. Symmetrically thereto is provided the cage 31 with balls and serving as slide bearings between the slide surface of parts 24 and element 26. By virtus of the bridge 36 interconnecting elements 25 and 26, these ball bearing parts 30 and 31 will move in unison up and down.

The cage 32 with balls rides on one side on the other surface of element 25 while engaging slide element so that element 27 can slidingly move along element 25. Symmetrically thereto is disposed the ball bearing cage 33 by means of which element 28 moves on element 26. The central element 29 is in engagement on both sides with uniformly moving ball bearing cages 34 and 35 by means of which element 29 moves in respect to elements 27 and 28.

The particular slide elements 26, 28, and 29 respectively carry pins 41, 42 and 43 which trasverse an elongated slot of the slotted crank lever 44 which turns on shaft 45. The shaft 45 pertains to the shutter drive mechanism and is an output shaft thereof. As lever 44 turns in a counterclockwise direction as far as FIG. 3 is concerned, all of the parts 25 through 29 begin to roll by operation of the ball bearings in a symmetrical guide arrangement whereby again the element 29 is being driven in an upward direction at a relatively high speed while elements 25 and 26 move up comparatively slowly. Accordingly, the lamella 40 is moved up or down relatively fast, lamella 39 moves at an intermediate speed and lamella 38 moves relatively slowly.

The drive and actuating mechanism could be supplemented, for example, by means of a second slotted lever engaging pins (not shown) on slide elements 25 and 27 and receiving also the particular pin 43. These two arms, 44 and the supplemental one, can be additionally supplemented by two additional lever arms to establish a four bar linkage. In such a case, one does not really need the bridges 36 and 37. And the lamellas 38, 39, and 40 are directly connected individually to the slide elements 25, 27, and 29. The elements 26 and 28 are then provided only for purposes of symmetrical guidance. As far as the four arms are concerned, only the particular arm illustrated, namely arm 44 remains fixed to drive shaft 45. At least one other arm can pivot on and is, therefore, journalled on shaft 45.

The invention is not limited to the embodiments described above but all changes and modifications thereof not constituting departures from the spirit and scope of the invention are intended to be included.

I claim:

1. In a focal plane shutter for photographic cameras having two shutter means respectively for colinearly moving across an image aperture in the camera, thereby respectively providing for opening and closing functions depending on the direction of movement and whereby one of the shutter means provides for opening movement for film exposure, while the other one of the shutter means provides for a delayed closing movement, each of the shutter means comprising:

a plurality of lamellas including an exposure slit defining lamella, each of said lamellas extending for the entire width of the image aperture, the lamellas each providing for movement in planes respectively parallel to the plane of the aperture, the planes being spaced transversely to this parallel extension so that each lamella can move independently from the others;

a plurality of slide elements respectively connected to or being a part of the lamella of the plurality of lamellas and being laterally offset in relation to each other;

means defining a plurality of straight, parallel slide paths and respectively receiving for guiding each of said slide elements, so that said slide elements move in said paths parallel to each other and to the direction of movement of said lamellas;

a plurality of pins respectively on said slide elements of the plurality of slide elements; and a slotted crank lever receiving and engaging the pins and extending parallel to said planes but transversely to said direction of guiding, said lever upon turning moving said pins and slide elements in said slide tracks thereby moving said lamellas in unison and at different speeds.

2. Focal plane shutter as in claim 1 wherein said means for guiding includes a plurality of individual stationary guides extending parallel to each other.

3. Focal plane shutter as in claim 1 wherein said means for guiding includes over stationary surface and movable separating elements respectively between said guide elements of the plurality.

4. Focal plane shutter as in claim 3 wherein said separating elements are cages for linear roller bearings including the rolls.

5. Focal plane shutter as in claim 1 and including a second plurality of slide elements connected in pairs to the slide elements of the plurality except one thereof, the slide elements of the pluralities respectively disposed symmetrical to the one element.

6. Focal plane shutter as in claim 5 wherein said means for guiding includes roller bearing-like cages with rolls interposed between adjacent ones of the guide elements of the pluralities.

7. Focal plane shutter as in claim 1 wherein said two shutter means are on the same side of said image aperture.

8. Focal plane shutter as in claim 7 wherein said means for guiding is shared by the two shutter means.

9. Focal plane shutter as in claim 1, wherein said slide elements are held by said means for guiding to prevent rotation of the slide elements and the respective lamellas as connected thereto.

* * * * *